United States Patent Office 3,206,116
Patented Sept. 14, 1965

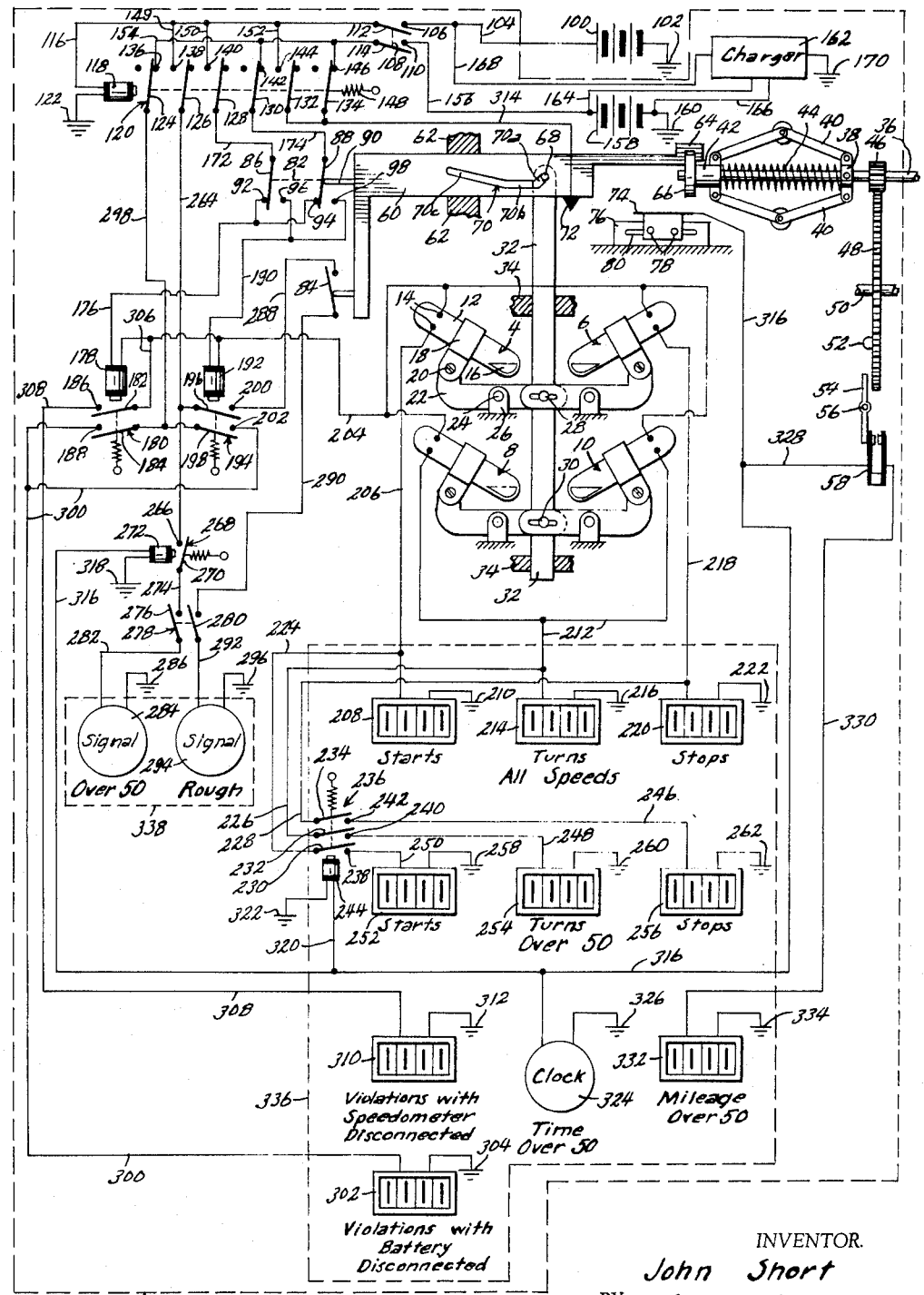

3,206,116
MONITORING DEVICE FOR AUTOMOBILE
OPERATION
John Short, 3535 Central St., Kansas City, Mo.
Filed Sept. 3, 1963, Ser. No. 306,053
14 Claims. (Cl. 235—91)

This invention relates to new and useful improvements in automobile safety apparatus, and has as its principal object the provision of a device which will automatically detect and record certain violations of safe driving practices.

For example, the device contemplated by the present invention includes inertia-actuated devices actuated by changes of momentum of the automobile, which will detect each time a car so equipped is turned too sharply or at too great a speed for safety, and will record the number of times this infraction occurs. Similarly, the device will detect and record braking or stops which are too abrupt, and starts or acceleration which are too rapid. The violations thus far noted may be termed "rough-handling" infractions. Also, the device will record the mileage and the length of time during which the car is driven at speeds higher than certain predetermined rates.

The device may be used by a car owner as a check on his own driving habits, or may be used openly as a warning to other persons who may drive the car that their driving practices are being monitored. In either of these cases, the device may be provided with audible or visual signals which will indicate to the driver when any of the rough-handling or speeding violations occur.

Also, the device may be concealed about the automobile, or disguised to conceal its nature, in order to conduct a secret check on any driver's habits. In this case the signals may be omitted, or rendered inoperative.

Also, the device is designed to thwart any attempt by a driver to deactivate it to escape detection of driving violations he may commit. While most portions of the device may be protected in a tamper-proof case, the device is normally operated electrically, and thus has a connection to the car battery, and also requires a connection to some speed-responsive element of the automobile, such as the speedometer gear, in order to detect speeding violations. If the driver should break the battery connection, an auxiliary battery takes over operation of the device, and will also record the fact that the disconnection was made, and the number of rough-handling violations which may occur while the car battery is disconnected. If the driver disconnects the speedometer connection, the device continues to detect and record all cases of rough-handling, and will record the fact that said disconnection was made, and the number of rough-handling violations which may occur while the speedometer is so disconnected. If either disconnection is made, the signalling devices cease to function, in order to avoid notifying the driver that his attempt to deactivate the device has been unsuccessful.

Rough-handling at speeds below a certain minimum level, says five miles per hour, is seldom pertinent to safety in driving, and the recording thereof might give a driver a deceptively adverse "score" on the device. Accordingly, the present device normally records no rough-handling violations which occur below said pre-determined minimum. However, if the driver should in some way sever the speedometer connection, then the device records all rough-handling violations regardless of speed.

As is also well-known, rough-handling violations become progressively more dangerous as the speed of travel of the automobile increases. That is, for example, a given change of momentum, as detected by the inertia-actuated devices, will indicate a greater danger at high speed than at low speed. Accordingly, the present device automatically increases the sensitivity of the inertia-actuated devices as the speed of the automobile increases. If the speedometer is disconnected, the devices will continue to function at maximum sensitivity.

Other objects are simplicity and economy of construction, efficiency and dependability of operation, and adaptability for use in a wide variety of applications.

With these objects in view, as well as other objects which will appear in the course of the specification, reference will be had to the accompanying drawing, which is a schematic diagram of a monitoring device embodying the present invention.

In said drawing, the numeral 2 indicates a tamper-proof box or case which contains the monitoring device. Said case should be lockable so as to be opened only by a key, and may be mounted at any convenient position in an automobile, either in a position visible to the driver if the monitoring is to be open, or in a position concealed from the driver if the monitoring is to be secret.

Mounted in case 2 are four inertia-operated electric switches 4, 6, 8 and 10. While various types of inertia switches could be utilized, each of said switches as shown is of the type consisting of a sealed glass tube 12 having a pair of spaced apart contacts 14 sealed in one end thereof and having a small quantity of mercury 16 sealed therein. The tube is mounted in a bracket 18 secured by a screw 20 to one end of an arm 22 which is pivoted intermediate its ends, as at 24, to a support 26 fixed in case 2. The opposite ends of arms 22 of all of switches 4, 6, 8 and 10 are pivoted, as at 28 and 30, to a vertical bar 32 which is carried for vertical sliding movement in guides 34 fixed in case 2. Switches 4, 6, 8 and 10, are tilted such that contacts 14 are at a higher level than mercury 16, so that said switches may be closed by any change of momentum of the car which causes mercury 16 to move upwardly along the tube 12 to interconnect contacts 14. The sensitivity of the switches, or the change of momentum required to close them, may be adjusted individually by loosening clamp screws 20 and adjusting the tilt of tubes 12 as desired. Sliding movement of bar 32 adjusts the tilt and hence the sensitivity of all of switches 4, 6, 8 and 10 simultaneously in response to changes of speed of the automobile, as will presently appear.

Switches 4 and 6 are mounted in a vertical plane parallel to the direction of travel of the automobile. Switch 4 is inclined upwardly to the rear of the automobile, so that whenever the car is accelerated excessively, as in a "drag" start, the mercury 16 will be caused by its inertia to move upwardly in the tube to connect contacts 14 to close the switch. Switch 6 is inclined upwardly toward the front of the automobile, whereby to be closed whenever the car is decelerated at an excessive rate, as by applying the brakes too forcibly. Sudden stops are of course sometimes necessary in emergencies, but the fact that the driver has allowed such an emergency to develop is also often an indication of bad driving habits, and indication of sudden stops is therefore a useful type of information to the supplied by the monitor. Switches 8 and 10 are disposed in a vertical plane transverse to the direction of travel of the automobile, so that whenever the car is turned too sharply in either direction, or at too great a speed for safety, one or the other of switches 8 or 10 will be closed by the excessive angular acceleration, in the same manner as switches 4 and 6. For example, switch 8 could indicate left turns, and switch 10 could indicate right turns.

The monitor also includes a speed responsive device. While again this device could be of any of several different types, as shown it includes a shaft 36 adapted to be interconnected with the speedometer cable or speedometer gear of the automobile, so that its rotational speed will be proportionate to the speed of travel of the automobile. Fixed on said shaft is a collar 38 connected by a pair of weighted toggles 40 to a collar 42 which is axially slidable on shaft 36 and urged away from fixed collar 38 by a spring 44. Collar 42 is shown in the position it assumes when the car is stopped, but it is urged to the right, as viewed in the drawing, by toggles 40 whenever the automobile is moving forwardly, its ultimate position depending upon the speed of travel of the automobile.

Fixed on shaft 36 is a gear pinion 46 which is meshed with a gear 48 rotatably mounted on a shaft 50 fixed in case 2. Mounted on a face of gear 48 is a lobe 52 which, once in each revolution of the gear, engages and pivots a lever 54 pivoted in the case at 56 to close momentarily a normally-open switch 58, for a purpose which will presently appear. Each revolution of gear 48 represents a fixed distance of travel of the automobile, for example one-tenth of a mile.

An elongated speed slide 60 is carried by guides 62 fixed in case 2 for movement parallel to shaft 36 and at right angles to bar 32. Said slide has a hook 64 which is engaged rotatably by a flange 66 of collar 42, whereby said slide is moved with said collar and positioned longitudinally according to the speed of the automobile. A pin 68 fixed in bar 32 is engaged slidably in a slot 70 formed longitudinally in slide 60, said slot being inclined in the direction of travel of bar 32, so that the position of said bar, and hence the sensitivity of switches 4, 6, 8 and 10, is determined by the speed of the automobile as indicated by the longitudinal position of slide 60. When the automobile is stopped and pin 68 is disposed in the extreme right end of slot 70, as shown in the drawing, it will be understood that switches 4, 6, 8 and 10 are set for maximum sensitivity. As the car speed increases from zero to a predetermined low speed, say 5 miles per hour, pin 68 traverses downwardly inclined portion 70a of slot 70, thereby lowering bar 32 and tilting switches 4, 6, 8 and 10 to their positions of minimum sensitivity. As the car speed increases from 5 miles per hour, to a predetermined higher speed, say 30 miles per hour, pin 68 traverses a horizontal portion 70b of slot 70. This does not change the sensitivity of switches 4, 6, 8 and 10, as experience has shown that within this range of speeds, as encountered in normal city driving, no particular object is accomplished by conditioning the indication of rough-handling violations on the speed of the vehicle. When the car is traveling at speeds higher than 30 m.p.h., pin 68 enters upwardly inclined portion 70c of slot 70, and the higher the speed, the more bar 32 will be elevated and the more sensitive switches 4, 6, 8 and 10 will be rendered. However, the specific contour of slot 70 may be varied as desired.

Speed slide 60 also carries a fixed contact 72 which, when the car is travelling at or above a predetermined high speed, such as 50 m.p.h., engages an elongated contact 74 carried by but insulated from a bracket 76 fixed in frame 2 adjacent the slide. Said contact is affixed to said bracket by screws 78 engaging a slot 80 in the bracket, so that the speed at which contact is made can be adjusted.

Speed slide 60 also operates a pair of switches 82 and 84. Switch 82 includes a pair of poles 86 and 88 interconnected so as to operate simultaneously, and interconnected to slide 60 as indicated at 90. When slide 60 indicates zero car speed, pole 86 engages contact 92 and pole 88 engages contact 94. When slide 60 moves to the right to indicate any speed above a predetermined minimum, say 5 m.p.h., pole 86 engages contact 96 and pole 88 engages contact 98. Between zero speed and 5 m.p.h., poles 86 and 88 are open.

Electric power for the device is normally supplied by the usual car battery 100, one terminal of which is grounded at 102, and the other terminal of which is connected by wire 104 with one fixed contact 106 of a double-pole switch 108 having a second fixed contact 110, and corresponding poles 112 and 114. Pole 112 is connected by wire 116 with the coil 118 of a gang relay 120, said coil being grounded at 122. Said gang relay has six armatures 124, 126, 128, 130, 132 and 134, with corresponding fixed contacts 136, 138, 140, 142, 144 and 146. Contacts 136, 142 and 146 are closed by spring 148 when coil 118 is de-energized, and contacts 138, 140 and 144 are closed when coil 118 is energized. Contacts 138, 140 and 144 are connected to wire 116 by wires 149, 150 and 152 respectively. Contacts 136, 142 and 146 are connected by wire 154 with pole 114 of switch 108, and the corresponding fixed contact 110 of said switch is connected by wire 156 with one terminal of an auxiliary battery 158 carried within case 2, the other terminal of said battery being grounded at 160. The auxiliary battery is of a rechargeable type, and is charged by a standard charger 162 connected to battery 158 by wires 164 and 166. Operating current for the charger is furnished from car battery 100 through wires 104 and 168, said charger being grounded at 170. Switch 108, which is a switch for turning the entire system on and off, is preferably operable from the exterior of case 2, but should be key-operated to prevent operation by unauthorized persons.

Armatures 128 and 130 of gang relay 120 are connected respectively by wires 172 and 174 to the poles 86 and 88 of switch 82 operated by speed slide 60. Contacts 92 and 94 of said switch are both connected by wire 176 with one terminal of the coil 178 of a normally open relay 180 having poles 182 and 184 operable to close respectively on fixed contacts 186 and 188 whenever coil 178 is energized. Similarly, contacts 96 and 98 of switch 82 are both connected by wire 190 with one terminal of the coil 192 of a normally open relay 194 having poles 196 and 198 operable to close respectively on fixed contacts 200 and 202 whenever coil 192 is energized. The opposite terminals of relay coils 178 and 192 are connected by a common wire 204 with one of the contacts 14 of each of inertia switches 4, 6, 8 and 10.

The second contact 14 of switch 4 is connected by wire 206 with a counter 208, said counter being grounded at 210 and adapted to advance one count each time current is supplied to wire 206. The second contacts of switches 8 and 10 are connected by a common wire 212 to a second counter 214 grounded at 216, and the second contact of switch 6 is connected by wire 218 to a third counter 220 grounded at 222. Counters 214 and 220 are similar in all respects to counter 208. Wires 206, 212 and 218 are connected respectively by wires 224, 226 and 228 to the armatures 230, 232 and 234 of a three-pole relay 236, said armatures being adapted to close respectively on fixed contacts 238, 240 and 242 whenever coil 244 of said relay is energized. Said fixed contacts are connected respectively by wires 246, 248 and 250 with a second set of counters 252, 254 and 256 corresponding in all respects to counters 208, 214 and 220, and being grounded respectively at 258, 260 and 262.

Armature 126 of gang relay 120 is connected by wire 264 with armature 196 of relay 194, and with the fixed contact 266 of a normally-open relay 268 having an armature 270 operable to close on said contact whenever coil 272 of said relay is energized. Armature 270 is connected by wire 274 through one pole 276 of a double-pole manual switch 278 having a second pole 280, and wire 282 to a signal device 284 which is grounded at 286 and which is adapted to give a signal, such as a lamp or buzzer, each time current is applied thereto. Contact 200 of relay 194 is connected through wire 288, switch 84 operated by speed slide 60, wire 290, pole 280 of switch 278 and wire 292 to a second signal device 294 which may be similar to signal device 284 and which is grounded at 296.

Armature 124 of gang relay 120 is connected by wire 298 to armatures 184 and 198 of relays 180 and 194. Contacts 188 and 202 of said relays are connected by a common wire 300 with a counter 302 which is grounded at 304 and which is similar to the other counters already described. Armature 182 of relay 180 is connected by wire 306 to wire 204, and contact 186 corresponding to this armature is connected by wire 308 to a counter 310 which is grounded at 312 and which is also similar to the various other counters.

Armatures 132 and 134 of the gang relay are connected by a common wire 314 to the contact 72 carried by speed slide 60, which engages contact 74 when the car goes faster than 50 m.p.h. Contact 74 is connected by wire 316 to the coil 272 of relay 268, said coil being grounded at 318. Wire 316 is further connected by wire 320 to coil 244 of relay 236, said coil being grounded at 322, also to an electrically actuated clock 324 which is grounded at 326 and which operates to indicate lapsed time as long as power is applied thereto. Wire 316 is also connected by wire 328 to one terminal of switch 58, the other terminal of said switch being connected by wire 330 with an odometer 332 which is grounded at 334 and which advances to indicate a car travel of one-tenth of a mile each time switch 58 is closed.

All of counters 208, 214, 220, 252, 254, 256, 302 and 310, together with clock 324 and odometer 332, are preferably disposed behind a panel 336 of case 2 which is normally closed and locked so that only authorized persons can view and read these instruments. The signal devices 284 and 294 may be signal lamps, in which case they are made visible through a transparent panel 338 of case 2. If the signals are buzzers, bells, or other audible devices, panel 338 will of course not be necessary.

To place the monitoring device in operation, the car owner first closes system switch 108 with a key, and if he desires that the driver be apprised each time a violation occurs, he also closes switch 278, said last named switch preferably being accessible only from the interior of locked case 2. If the monitoring is to be secret, switch 278 is left open. Closure of switch 108 completes a circuit from car battery 100 through wire 104, pole 112 of switch 108, wire 116, and coil 118 of gang relay 120 to ground at 122, thus energizing coil 118 to actuate relay 120 to open contacts 136, 142 and 146 thereof, and to close contacts 138, 140 and 144 thereof. Coil 118 will remain energized, and relay 120 will hence remain in this position, as long as switch 108 is closed, and as long as the connection 104 to car battery 100 is maintained intact. Auxiliary battery 158 is then out of the circuit, since all of the contacts of relay 120 connected to the auxiliary battery are then open.

Actuation of relay 120 as just described extends a circuit from car battery wire 116 through wire 150, armature 128 of relay 120 and wire 172 to pole 86 of switch 82. Assuming next that the car has been set in motion and is travelling at a speed sufficient to cause speed slide 60 to allow poles 86 and 88 of switch 82 to close on contacts 96 and 98 (above 5 m.p.h. in the example given above), and to close switch 84, the circuit from pole 86 continues through wire 190, coil 192 of relay 194 and wire 204 to one of the contacts 14 of each of inertia switches 4, 6, 8 and 10. If, for example, the car is then accelerated at an excessive rate, switch 4 will be closed momentarily as previously described, and this completes the circuit through switch 4, wire 206 and counter 208 to ground at 210, thereby energizing said counter which advances one count to record the violation. Closure of switch 4 also completes a circuit from said switch through wires 206 and 224, armature 230 of relay 236, wire 250 and counter 252 to ground at 258. However, relay 236 is then open (assuming that the car is travelling less than 50 m.p.h.), so counter 252 is not actuated. Similarly, deceleration of the car at an excessive rate will cause switch 6 to close momentarily, completing a circuit from switch 6 through wire 218 and counter 220 to ground at 222, actuating counter 220 to record the violation, and will also complete a circuit from switch 6 through wires 218 and 228, armature 234 of relay 236, wire 246 and counter 256 to ground at 262, although counter 256 will not then be actuated since relay 236 is open. Also, if the car is turned too sharply or at too great a speed for safety, one or the other of switches 8 and 10 will close momentarily, completing a circuit from either of said switches through wire 212 and counter 214 to ground at 216, whereby said counter is actuated to record the violation, and will also complete a circuit from wire 212 through wire 226, armature 232 of relay 236, wire 248 and counter 254 to ground at 260, though counter 254 will not be actuated at this time since relay 236 is open.

It is important to note that the sensitivity of inertia switches 4, 6, 8 and 10, that is, the rate of change of momentum of the car required to close them, is under the control of speed slide 60. When the car has reached about 5 m.p.h. and pin 68 enters in horizontal portion 70b of slot 70 of the slide, the inertia switches are set at minimum sensitivity, and no change of sensitivity occurs until the car reaches about 30 m.p.h. and pin 68 enters inclined slot section 70c. Thereafter any increase of speed elevates bar 32 and tilts switches 4, 6, 8 and 10 to a more nearly horizontal position, thereby increasing their sensitivity. This provision is made in recognition of the fact that even relatively slight "rough-handling," as indicated by relatively small changes of momentum, is actually indicative of more dangerous driving practices at higher speeds than at lower speeds. As previously stated, slot 70 may be designed as desired for increasing sensitivity of switches 4, 6, 8 and 10 at various other speeds, or at different rates.

Completion of any of the "rough-handling" circuits of switches 4, 6, 8 or 10, as just described, causes coil 192 of relay 194 to be energized, since it is connected in series in a common leg of all of said circuits. Energizing of said coil closes both of the armature circuits of said relay. Closure of armature 198 has no effect at this time, since armature 124 of gang relay 120, to which armature 198 is connected, is then open. However, closure of armature 196 completes a circuit from car battery wire 116 through wire 149, contact 138, armature 126 of gang relay 120 (then closed), wire 264, armature 196, contact 200, wire 288, switch 84 (closed by speed slide 60), wire 290, pole 280 of switch 278 (assuming that the car owner has closed said switch), wire 292 and signal 294 to ground at 296. Therefore, signal 294 is actuated each time a rough-handling violation occurs, as an indication to the driver.

If the automobile reaches a pre-determined high speed (50 m.p.h. in the example given), speed slide 60 moves to the right to cause contact 72 carried thereby to engage contact 74, members 72–74 constituting a "speed switch". Closure of said switch completes a circuit from car battery wire 116 through wire 152, armature 132 of gang relay 120, wire 314, contacts 72 and 74, wire 316 and coil 272 of relay 268 to ground at 318, thus energizing coil 272 to close said relay. Closure of relay 268 completes a circuit from car battery wire 116 through wire 149, armature 126 of gang relay 120, wire 264, contact 266 and armature 270 of realy 268, wire 274, pole 276 of switch 278, wire 282 and signal 284 to ground at 286. Signal 284 thus operates continuously as long as the car is exceeding 50 m.p.h., as an indication to the driver.

Closing of speed switch 72–74 also completes a circuit therefrom through wires 316, 320, and coil 244 of relay 236 to ground at 322, thus energizing said coil to close said relay. Thereafter, each time any of switches 4, 6, 8 or 10 is closed to indicate a rough-handling violation, said violation will be recorded not only on counters 208, 214 or 220 as previously described, but also on the corresponding counters 252, 254 or 256, whereby to record the number of violations of each type which occurred at speeds in excess of 50 m.p.h.

Closing of speed switch 72–74 also completes a circuit therefrom through wire 316 and clock 324 to ground at 326, thus energizing said clock to cause it to indicate the total lapsed time during which the car was driven over 50 m.p.h.

Closure of speed switch 72–74 also completes a circuit therefrom through wires 316 and 328, switch 58 (which is closed momentarily by rocker lever 54 once for each one-tenth mile of travel of the car), wire 330 and odometer 332 to ground, at 334. Thus said odometer, which is also essentially a counter, indicates the total mileage during which the car is driven over 50 m.p.h. By dividing the time indicated by clock 324 into the mileage indicated by odometer 332, it may be determined how much above 50 m.p.h. the average excess speed actually was.

The driver might attempt to disable the monitor, and thereby to escape detection of his driving violations, either by disconnecting or otherwise severing the connection 104 to the car battery 100, or by disconnecting shaft 36 from the speedometer gear of the car, or both. If he disconnects the car battery, the circuit to coil 118 of gang relay 120 is broken, and said relay is returned by spring 148 to the position shown in the drawing. This opens armature 128 of the gang relay, thereby deactivating pole 86 of switch 82, but closes armature 130 of the gang relay, thereby connecting auxiliary battery 158 to pole 88 of switch 82 through wire 156, key switch 108, wire 154, armature 130 and wire 174. Then, assuming that the car is travelling at more than 5 m.p.h., pole 88 moves into engagement with contact 98. From contact 98, power is furnished through wire 190, coil 192 of relay 194 and wire 204 to inertia switches 4, 6, 8 and 10. Hence the counters 208, 214 and 220 continue to record each rough-handling violation just as in normal operation, except that they are powered by auxiliary battery 158. The "over 50" counters 252, 254 and 256 also continue to operate normally since speed switch 72–74 is then furnished with auxiliary battery power through armature 134 of gang relay 120, and therefore coil 244 is energized whenever the car exceeds 50 m.p.h. to close relay 236 to said "over 50" counters. Also, since speed switch 72–74 is activated, clock 324 and odometer 332 continue to operate at all speeds over 50 m.p.h. Closure of speed switch 72–74 also energizes coil 272 and closes relay 268, but this has no function at this time, since armature 126 of gang relay 120, which supplies operating current to both of signals 284 and 294, is then open. Hence, with the car battery disconnected, neither signal device can operate to warn the driver that his attempt to disable the monitor has been unsuccessful.

Completion of any of the rough-handling circuits through inertia switches 4, 6, 8 and 10 still energizes coil 192 of relay 194, just as in normal operation, whereby said relay is closed. Closure of pole 196 of said relay is without effect since armature 126 of relay 120 is then open, but closure of pole 198 completes an auxiliary battery circuit from armature 124 of relay 120 (then closed) through wire 298, pole 198, wire 300 and counter 302 to ground at 304. Counter 302 thus not only records the fact that the car battery has been disconnected, but also records the total number of rough-handling violations which may occur while said battery is discontinued.

If the driver should not disconnect the car battery, but does disconnect shaft 36 from the speedometer gear of the car, then coil 118 of gang relay 120 remains energized, and pole 86 of switch 82 is connected to the car battery through armature 128 of the gang relay. However, speed slide 60 will not move, so pole 86 remains in engagement with contact 92 at all speeds of the car. Contact 92 thus becomes the operative contact of switch 82. From said contact, current flows through wire 176, coil 178 of relay 180 and wire 204 to inertia switches 4, 6, 8 and 10, so that counters 208, 214 and 220 continue to record rough-handling violations at all speeds, just as before. Also, since speed switch 72–74 cannot close, clock 324 and odometer 332 cannot operate, coil 244 of relay 236 cannot be energized so that counters 252, 254 and 256 cannot operate, and coil 272 of relay 268 cannot be energized, whereby relay 268 will not close to energize speed signal 284. Also, rough-handling signal 294 cannot operate, since switch 84 in the circuit thereof remains open at all car speeds. Thus neither of signals 284 or 294 can operate to warn the driver that his attempt to disable the monitor has been unsuccessful. As described, completion of any of the rough-handling circuits through switches 4, 6, 8 or 10 now causes coil 178 to be energized, thereby closing relay 180. Closure of armature 184 of said relay is without effect at this time, since armature 124 of relay 120 is then open, but closure of armature 182 completes a circuit from wire 204 (which is a "hot" wire at all times either from car battery or auxiliary battery power) through wire 306, armature 182, wire 308 and counter 310 to ground at 312. Thus counter 310 records each rough-handling violation which may occur at any speed, with the speedometer disconnected.

If the driver should disconnect both the car battery and the speedometer, then coil 118 of gang relay 120 is de-energized, allowing said relay to be returned to the position shown in the drawing by spring 148, whereby to connect auxiliary battery 158 through armature 130 of relay 120 to pole 88 of switch 82, which remains in engagement with contact 94 of said switch at all speeds, contact 94 hence becoming the operative contact of switch 82. Contact 94 is connected through wire 176, coil 178 and wire 204 to inertia switches 4, 6, 8 and 10 as before. The operation is now substantially the same as that described with only the speedometer disconnected, counters 208, 214 and 220 being operable to record rough-handling violations at all speeds, signals 284 and 294, counters 252, 254, 256, clock 324 and odometer 332 being inoperative, and counter 310 being operative through armature 182 of relay 180 each time relay 180 is closed by the energizing of coil 178 as a result of the completion of any rough-handling circuit through switches 4, 6, 8 or 10. However, now each closure of relay 180 also completes an auxiliary battery circuit through armature 124 of relay 120 (now closed), wire 298, armature 184, wire 300 and counter 302 to ground at 304, whereby counter 302 is advanced one count. Thus with both the car battery and the speedometer disconnected, counters 208, 214 and 220 continue to record the total number of each type of rough-handling violations, and counters 302 and 310 record the total number of rough-handling violations of all types which occur after either or both of said disconnections are made, regardless of speed. It will be seen also that whenever the speedometer is disconnected, adjusting pin 68 remains in the upper end of sloped portion 70a of slot 70 of speed slide 60, so that inertia switches 4, 6, 8 and 10 are adjusted to their positions of maximum sensitivity. This of course penalizes the driver for his attempt to disable the monitor in that rough-handling violations will be recorded at normal speeds which would otherwise not be considered by the monitor to be violations at all if the speedometer were left connected and the speed slide adjusted the inertia switches to a lower sensitivity at said normal speeds. However, this is considered preferable to permitting the driver, by disconnecting the speedometer, to avoid the increased sensitivity introduced at higher speeds by the entry of pin 68 into portion 70c of slot 70, since rough-handling at said higher speeds is of course far more indicative of truly dangerous driving habits than at lower speeds. If such penalizing of the driver is not desired, slot section 70a could be made simply a horizontal extension of section 70b.

Finally, it will be understood that poles 86 and 88 of switch 82 engage contacts 92 and 94 when the car is stopped or the speedometer is disconnected, and engage contacts 96 and 98 when the speedometer is connected and the car is travelling faster than a predetermined low speed such as 5 m.p.h., but do not engage either set of contacts when the speedometer is connected and the car is travelling between 0 and 5 m.p.h. Thus no rough-handling violations are normally recorded at these low speeds. This provision is made as a practical matter since rough-handling at such low speeds has little meaning or pertinence with relation to safety, so that the recording thereof would tend to give a driver a deceptively bad score or rating on the monitor. However, switch 82 remains closed on contacts 92 and 94 at all speeds, even at 0–5 m.p.h., if the speedometer is disconnected. This is a further penalty imposed on drivers who attempt to disable the monitor by disconnecting the speedometer. In fact, with both of the penalty provisions operative, a driver will probably obtain a far better score as to rough-handling violations with the speedometer connected than without, and a driver could be informed of this fact if he knows that the monitor is present. If he does not know of the presence of the monitor, he of course would make no attempt to disable it.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A monitoring device for automobile operation comprising:
   (a) a plurality of inertia-actuated devices adapted to be attached to an automobile, and to be actuated respectively by changes of momentum of said automobile in different directions, whenever said momentum changes occur at faster than predetermined rates,
   (b) a plurlaity of counter devices each interconnected with and operable by at least one of said inertia-actuated devices whereby to record the number of times said inertia-actuated devices are activated,
   (c) a speed-responsive device adapted to be interconnected with any element of said automobile having a function proportionate to the speed of travel of said automobile, whereby said speed-responsive device has an output function proportionate to the speed of the automobile,
   (d) means operable by the output function of said speed-responsive device to render said inertia-actuated devices inoperative when said automobile is moving at less than a pre-determined minimum speed, and
   (e) means operable by said speed-responsive device to render said inertia-actuated devices operative whenever said speed-responsive device indicates zero speed of said automobile, whereby said inertia-actuated devices remain operative even if said speed-responsive device should be disconnected from the speed-responsive element of said automobile.

2. A monitoring device for automobile operation comprising:
   (a) a plurality of inertia-actuated devices adapted to be attached to an automobile, and to be actuated respectively by changes of momentum of said automobile in different directions, whenever said momentum changes occur at faster than predetermined rates,
   (b) a plurality of counter devices each interconnected with an operable by at least one of said inertia-actuated devices whereby to record the number of times said inertia-actuated devices are activated,
   (c) a speed-responsive device adapted to be interconnected with any element of said automobile having a function proportionate to the speed of travel of said automobile, whereby said speed-responsive device has an output function proportionate to the speed of the automobile, and
   (d) sensitivity adjusting means operable by said speed-responsive device to adjust said inertia-actuated devices whereby to vary the rate of change of momentum required to actuate the same, whereby said inertia-actuated devices will have a sensitivity determined by the speed of travel of said automobile.

3. A monitoring device as recited in claim 2 wherein said sensitivity adjusting means adjusts said inertia-actuated devices to a maximum sensitivity when said speed-responsive device indicates zero speed, adjusts to a minimum sensitivity when said speed-responsive device indicates any speed between predetermind minimum and intermediate speeds, and gradually increases sensitivity to a maximum as speed increases from said intermediate speed.

4. A monitoring device for automobile operation comprising:
   (a) a plurality of inertia-actuated devices adapted to be attached to an automobile, and to be actuated respective by changes of momentum of said automobile in different directions, whenever said momentum changes occur at faster than predetermined rates,
   (b) a plurality of counter devices each interconnected with and operable by at least one of said inertia-actuated devices whereby to record the number of times said inertia-actuated devices are activated,
   (c) a speed-responsive device adapted to be interconnected with any element of said automobile having a function proportionate to the speed of travel of said automobile, whereby said speed-responsive device has an output function proportionate to the speed of the automobile,
   (d) an additional counter device,
   (e) means operable by actuation of any of said inertia-actuated devices to actuate said additional counter, and
   (f) means operable by said speed-responsive device to render said additional counter inoperative whenever said speed-responsive device is indicating at least a minimum positive speed of travel of said automobile.

5. A monitoring device for automobile operation comprising:
   (a) a plurality of inertia-actuated devices adapted to be attached to an automobile, and to be actuated respectively by changes of momentum of said automobile in different directions, whenever said momentum changes occur at faster than predetermined rates,
   (b) a plurality of counter devices each interconnected with and operable by at least one of said inertia-actuated devices whereby to record the number of times said inertia-actuated devices are activated,
   (c) a speed-responsive device adapted to be interconnected with any element of said automobile having a function proportionate to the speed of travel of said automobile, whereby said speed-responsive device has an output function proportionate to the speed of the automobile,
   (d) a signal device operable when actuated to emit a sensory signal,
   (e) means operable by actuation of any of said inertia-actuated devices to actuate said signal device, and
   (f) means operable by said speed-responsive device to render said signal device inoperative except when said speed-responsive device is operating to indicate at least a minimum positive speed.

6. A monitoring device for automobile operation comprising:
   (a) a plurality of inertia-actuated devices adapted to be attached to an automobile, and to be actuated respectively by changes of momentum of said automobile in different directions, whenever said momentum changes occur at faster than predetermined rates, (b) a plurality of counter devices each interconnected with and operable by at least one of said inertia-actuated devices whereby to record the number of times said inertia-actuated devices are activated, (c) a speed-responsive device adapted to be interconnected with any element of said automobile having a function proportionate to the speed of travel of said automobile, whereby said speed-responsive device has an output function proportionate to the speed of the automobile, (d) a second set of counter devices corresponding to said first named set of counter devices and operable in like manner by said inertia-actuated devices, and (e) means operable by said speed-responsive device to render said second set of counter devices inoperative, except when the speed of travel of said automobile exceeds a predetermined high rate.

7. A monitoring device for automobile operation comprising:

(a) a plurality of inertia-actuated devices adapted to be attached to an automobile, and to be actuated respectively by changes of momentum of said automobile in different directions, whenever said momentum changes occur at faster than predetermined rates, (b) a plurality of counter devices each interconnected with and operable by at least one of said inertia-actuated devices whereby to record the number of times said inertia-actuated devices are activated, (c) a speed-responsive device adapted to be interconnected with any element of said automobile having a function proportionate to the speed of travel of said automobile, whereby said speed-responsive device has an output function proportionate to the speed of the automobile, (d) a clock operable to indicate lapsed time when actuated, and (e) means operable by said speed-responsive device to actuate said clock whenever the speed of travel of said automobile exceeds a predetermined high rate.

8. A monitoring device for automobile operation comprising:

(a) a plurality of inertia-actuated devices adapted to be attached to an automobile, and to be actuated respectively by changes of momentum of said automobile in different directions, whenever said momentum changes occur at faster than predetermined rates, (b) a plurality of counter devices each interconnected with and operable by at least one of said inertia-actuated devices whereby to record the number of times said inertia-actuated devices are activated, (c) a speed-responsive device adapted to be interconnected with any element of said automobile having a function proportionate to the speed of travel of said automobile, whereby said speed-responsive device has an output function proportionate to the speed of the automobile, (d) a mileage indicating device adapted to be connected with any element of an automobile having a function proportionate to the distance travelled by said automobile, whereby when actuated to record the distance travelled by said automobile, and (e) means operable by said speed-responsive device to actuate said mileage indicating device whenever the speed of travel of said automobile exceeds a predetermined high rate.

9. A monitoring device for automobile operation comprising:

(a) a plurality of inertia-actuated devices adapted to be attached to an automobile, and to be actuated respectively by changes of momentum of said automobile in different directions, whenever said momentum changes occur at faster than predetermined rates, (b) a plurality of counter devices each interconnected with and operable by at least one of said inertia-actuated devices whereby to record the number of times said inertia-actuated devices are activated, (c) a speed-responsive device adapted to be interconnected with any element of said automobile having a function proportionate to the speed of travel of said automobile, whereby said speed-responsive device has an output function proportionate to the speed of the automobile, (d) a mileage indicating device adapted to be connected with any element of an automobile having a function proportionate to the distance travelled by said automobile, whereby when actuated to record the distance travelled by said automobile, (e) a clock operable when actuated to indicate elapsed time, and (f) means operable by said speed-responsive device to actuate said mileage indicating device and said clock whenever the speed of travel of said automobile exceeds a predetermined high rate.

10. A monitoring device for automobile operation comprising:

(a) a plurality of inertia-actuated devices adapted to be attached to an automobile, and to be actuated respectively by changes of momentum of said automobile in different directions, whenever said momentum changes occur at faster than predetermined rates, (b) a plurality of counter devices each interconnected with and operable by at least one of said inertia-actuated devices whereby to record the number of times said inertia-actuated devices are activated, each of said inertia-actuated devices constituting an electric switch operable to close responsively to said changes of momentum and having an operative electric circuit including said switch and the associated counter device, said counter device being electrically operable, all of said operative electric circuits having a common leg connected to the usual automobile battery whereby power is obtained for said circuits, (c) an auxiliary electric battery not normally connected in said operative circuits, and (d) transfer means operable whenever the connection of said circuits to said usual automobile battery is broken to insert said auxiliary battery in said operative circuits.

11. A monitoring device as recited in claim 10 with the addition of:

(a) a signal device operable to emit a sensory signal, (b) means operable by the actuation of any of said inertia-actuated devices to cause operation of said signal device, and (c) means operable whenever said automobile battery connection is broken to render said signal device inoperative.

12. A monitoring device as recited in claim 11 with the addition of:

(a) a speed-responsive device adapted to be interconnected with any element of said automobile having a function proportionate to the speed of travel of said automobile, whereby said speed-responsive device has an output function proportionate to the speed of the automobile, and (b) means operable by said speed-responsive device to render said signal device inoperative except when said speed-responsive device is operating to indicate at least a minimum positive speed.

13. A monitoring device for automobile operation comprising:

(a) a plurality of inertia-actuated devices adapted to be attached to an automobile, and to be actuated respectively by changes of momentum of said automobile in different directions, whenever said momentum changes occur at faster than predetermined rates, (b) a plurality of counter devices each interconnected with and operable by at least one of said inertia-actuated devices whereby to record the number of times said inertia-actuated devices are activated, (c) a speed-responsive device adapted to be interconnected with any element of said automobile having a function proportionate to the speed of travel of said automobile, whereby said speed-responsive device has an output function proportionate to the speed of the automobile, each of said inertia-actuated devices constituting an electric switch operable to close responsively to said changes of momentum and having an operative electric circuit including said switch and the associated counter device, said counter devices being electrically operable, all of said operative electric circuits having a common leg connected to the usual automobile battery whereby power is obtained for said circuits, (c) an auxiliary electric battery not normally connected in said operative circuits, (d) an additional counter device which is electrically operable and included in a counter circuit including a normally open switch and said auxiliary battery, (e) means operable by actuation of any of said inertia-actuated devices to actuate said additional counter whenever said switch is closed, and (f) transfer means operable whenever said automobile battery connection is broken to insert said auxiliary battery in said operative circuits and to close said switch.

14. A monitoring device as recited in claim 13 with the addition of:

(a) a speed-responsive device adapted to be interconnected with any element of said automobile having a function proportionate to the speed of travel of said automobile, whereby said speed-responsive device has an output function proportionate to the speed of the automobile, and (b) means operable by said speed-responsive device to render said additional counter inoperative when said automobile is travelling at less than a predetermined minimum positive rate of speed.

References Cited by the Examiner

UNITED STATES PATENTS

| 665,998 | 1/01 | Davis | 235—91.11 |
| 1,970,483 | 8/34 | Alden | 235—91.11 |
| 2,244,417 | 6/41 | Bacon | 73—514 X |
| 2,495,340 | 1/50 | Milster | 73—492 X |

LEO SMILOW, *Primary Examiner.*

LEYLAND M. MARTIN, *Examiner.*